(No Model.) 2 Sheets—Sheet 1.
M. ROWE.
RIDING HARROW.
No. 604,339. Patented May 17, 1898.
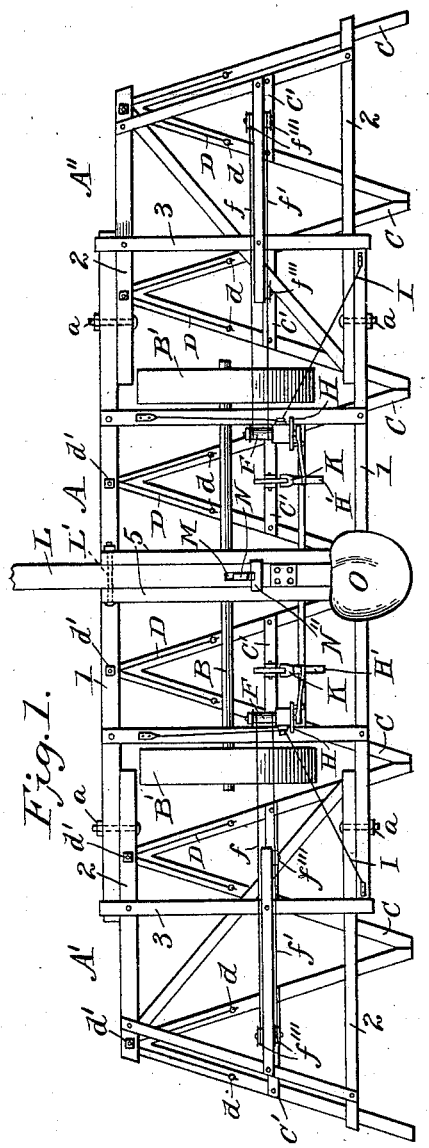
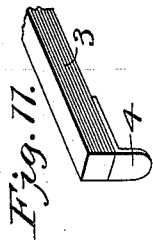
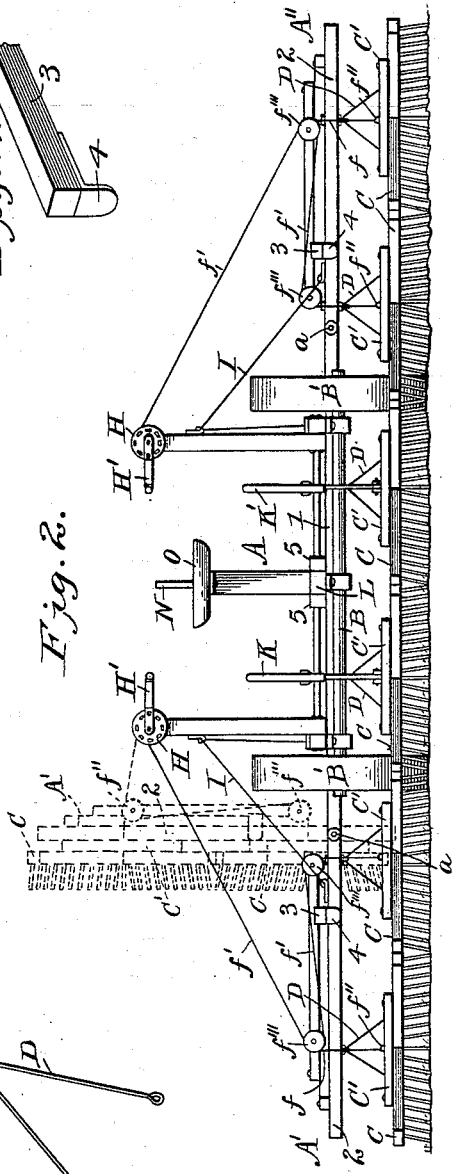
Witnesses.
Edwin G. McKee
Philip C. Masi.
Inventor.
Myron Rowe
by E. W. Anderson
his Attorney.
THE NORRIS PETERS CO., PHOTO-LITHO., WASHINGTON, D. C.

(No Model.) 2 Sheets—Sheet 2.
M. ROWE.
RIDING HARROW.
No. 604,339. Patented May 17, 1898.
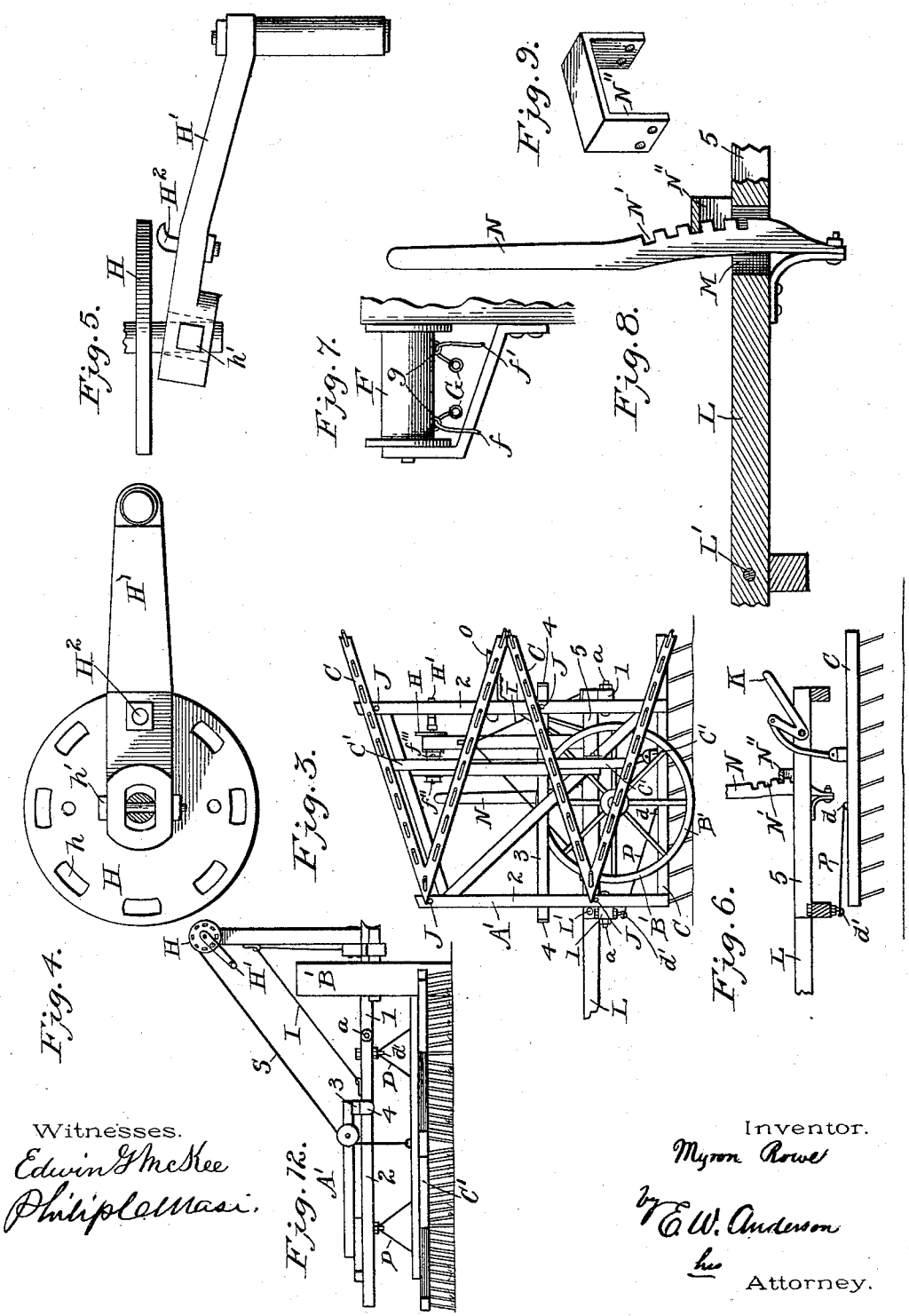
Witnesses.
Edwin G. McKee
Philip C. Masi
Inventor.
Myron Rowe
by E. W. Anderson
his Attorney.
THE NORRIS PETERS CO., PHOTO-LITHO., WASHINGTON, D. C.

UNITED STATES PATENT OFFICE.

MYRON ROWE, OF CLARKSVILLE, IOWA, ASSIGNOR OF ONE-HALF TO NELSON J. WALRATH, OF SAME PLACE.

RIDING-HARROW.

SPECIFICATION forming part of Letters Patent No. 604,339, dated May 17, 1898.

Application filed October 2, 1897. Serial No. 653,772. (No model.)

*To all whom it may concern:*

Be it known that I, MYRON ROWE, a citizen of the United States, and a resident of Clarksville, in the county of Butler and State of Iowa, have invented certain new and useful Improvements in Riding-Harrows; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

Figure 1 is a plan view of a harrow embodying my invention. Fig. 2 is a rear end view of the same. Fig. 3 is a side elevation with one of the wing-sections raised. Figs. 4 and 5 are detail views of the windlass and its crank. Fig. 6 is a fragmentary view showing the means for raising one of the central drags. Fig. 7 is a detail view of the windlass. Figs. 8 and 9 are detail views, the former showing the main elevating-lever and its catch and the latter the catch-plate detached. Fig. 10 is a detail view showing the manner in which the drags are connected to the frame. Fig. 11 is a detail perspective view of one end portion of one of the bars 3, and Fig. 12 is an end view of a part of the harrow and illustrating a modified construction.

This invention has relation to riding-harrows; and it is designed to provide a harrow of this character having a number of independently-movable sections to which independent drags are attached with means under the control of the driver, whereby either of the movable sections or any one or all of the drags can be readily raised and lowered out of and into operation for the purpose of avoiding obstructions or for clearing of rubbish, &c.

With this object in view the invention consists in the novel construction and combination of parts, all as hereinafter described, and pointed out in the appended claims.

Referring to the accompanying drawings, the letters A A' A'' designate the frame of the harrow, the part A being a main or central section, while the parts A' A'' are lateral or wing sections, which are hinged or pivoted to the main section by suitable connections, such as the hinge-bolts, (indicated at $a$.) The front and rear bars 1 of the main section A are extended laterally of said section to receive between them the inner end portions of the corresponding bars 2 of the wing-sections, the cross-bars 3 of the latter being also extended at their ends over the said bars 1, which they engage by means of the iron clasps 4. These clasps, it will be readily seen, aid the hinge-bolts $a$ (which extend through the adjacent portions of the bars 1 and 2) in connecting the sections together without interfering with the movements of the wing-sections on said bolts.

B designates the axle, which is suitably supported upon the under side of the main frame-section A and upon which are mounted the supporting-wheels B'.

Suspended from each of the three frame-sections are two V-shaped drags C, connected thereto by means of V-shaped angle-irons D at their front end portions. The rear ends of the said irons are loosely connected to the drags at $d$, and their forward ends engage bolt-hooks $d'$, secured in the said sections. This method of coupling the drags to the frame is designed to provide for a positive movement of the drag-sections with the frame in case the team should back or otherwise disturb the orderly working of the machine, while at the same time it permits sufficient individual movement or play of the drags under ordinary working conditions.

The wing-sections are raised into the perpendicular positions indicated in Fig. 3 by means of windlasses F, mounted upon the main section and having each two ropes, cables, or chains $ff'$, which are secured, respectively, to rings or staples $f''$ in the cross-bars C' of the respective drags of that section. These ropes or the like then pass upwardly over pulleys $f'''$, mounted upon the upper sides of the sections, and thence to the windlass. At each windlass the ropes pass through staples $g$ on the axle or spool thereof and terminate in rings G or the like. These rings G, or their equivalents, have a twofold purpose: first, to enable the driver to take hold of them in operation to raise either drag high enough to clear itself of obstructions or of rubbish, and, second, to hold the ropes in place on the windlass when the driver for any purpose desires to raise, by means of the windlass, the wing-section with both its drags.

In the construction of each windlass the axle thereof passes through a hole in the center of a circular plate H, which is rigidly secured to the windlass-support and is provided with a series of openings or slots $h$ therein.

H' is the operating-crank, having a dog or clutch H'', which is designed to engage any one of the slots $h$. This crank is usually attached to the windlass-axle by means of a bolt $h'$, passing horizontally through it and through a hole in the axle. The hole in the crank which receives the said bolt $h'$ is such as to insure sufficient play of the crank in engaging or withdrawing the dog or clutch from engagement with the said plate. The crank-handle has an outward bend sufficient to prevent its contact with the upright of the windlass-support in operating the clutch.

When it is required to move the machine to the field to pass through gates, over bridges, &c., the two wing-sections may be raised to and held in vertical positions by winding the ropes of cables $ff'$, and in this position they rest against braces I, fixed to and extending outward from points near the upper ends of the posts or uprights which support the windlasses. It will be observed that inasmuch as the said ropes or cables pass over the pulleys $f'''$ on the upper sides of the wing-sections and make direct connection with the drags in the process of hoisting the drags are first brought up firmly against the under sides of the sections and are held in place not only by the friction of the parts thus brought and held together, but also by the angle-irons D, which prevent forward-and-backward movement thereof. They also rest upon pins J, which project outward from the under side of the sections, so that when the drags are first raised they are brought in contact with these pins.

K K' are two hand-levers by means of which the drags on the main or central section A may be raised or lowered, as required. The arrangement and connection of these levers are best shown in Fig. 8.

L designates the pole or tongue, which is held between the two parallel pieces or beams 5 of the section A, being secured by a bolt L, inserted horizontally through the said pieces and through the body of the tongue. Formed in the rear end portion of the tongue is a mortise M. N is a lever which extends through the said mortise and whose lower portion consists of a bar of spring-steel secured at $m$ by a bolt. Said lever is notched, as indicated at N', and locks to an arm N'', which is secured to the said pieces 5. By means of this lever the entire frame may be rocked or tilted on the axle.

O indicates the driver's seat. The driver can readily manipulate the two windlasses and the several levers without leaving this seat and without stopping his team.

In the construction shown in place of two separate V-shaped drags C for each section I employ one large drag C'. The arrangement is substantially the same as that which has been described, except that in place of the two ropes $ff'$ for each wing-section I employ a single rope S for each of these large drags, as shown in the said figure.

Having thus described my invention, what I claim as new, and desire to secure by Letters Patent, is—

1. In a riding-harrow, the combination with a central or main frame-section, having one or more drags suspended therefrom, of lateral or wing frames hinged or pivoted at their inner edges to the central or main frame-section, one or more drags flexibly suspended from each of said lateral or wing frames, means whereby each of the said drags may be raised or lowered toward and away from the respective frame-sections independently of the others, and means whereby each wing-section with its drag or drags may be raised on its hinge or pivot connection with the main or central frame-section, substantially as specified.

2. In a riding-harrow, the combination of a frame, consisting of a central wheel-supported section, and laterally-extending wing-sections hinged or pivoted to said central section, one or more drags flexibly suspended from each of the said sections underneath the same, windlasses mounted upon the said central section, ropes or the like connected to said windlasses and to the drags of the lateral sections, said ropes having an intermediate bearing on said lateral sections, whereby by a partial operation of said windlasses, the drags may be raised toward the under side of said sections, and by a further operation, the said sections will be raised on their hinge connections and carry the drags with them, means for supporting the sections when so raised, and means for supporting the drags in raised positions on the sections, substantially as specified.

3. In a riding-harrow, the combination with a main frame-section having one or more drags suspended therefrom, of a lateral or wing frame-section hinged or pivoted to said main frame-section, two independent drags flexibly suspended from the said lateral or wing section, a windlass mounted upon the main frame-section, and two independent ropes or cables which connect the said windlass with the respective drags, said ropes having means whereby they may be operated independently of the windlass, means for locking said windlass in the desired position, and means on the under side of the lateral or wing section for supporting its drags thereon when the said section is raised on its hinge or pivot connection, substantially as specified.

4. In a riding-harrow, the combination of the main section, the lateral or wing sections hinged or pivoted thereto and adapted to be raised into substantially vertical positions, the independent drags suspended from said main and lateral or wing sections, the two windlasses mounted on the main section, ropes or the like running from each windlass to each of the said drags on the wing-sections and having intermediate bearings on the said sections, said ropes being also arranged to be operated individually independently of the windlasses, means for holding said drags in position on the sections when raised, and means for raising the drag or drags of the main section, substantially as specified.

In testimony whereof I affix my signature in presence of two witnesses.

MYRON ROWE.

Witnesses:
 J. R. FLETCHER,
 C. H. ILGENFRITZ.